Sept. 20, 1955  R. R. MacMILLAN  2,718,369
PILOT CHUTE
Filed March 19, 1953

INVENTOR.
ROBERT R. MacMILLAN
BY Albert Sperry
ATTORNEY

United States Patent Office 2,718,369
Patented Sept. 20, 1955

2,718,369
PILOT CHUTE

Robert R. MacMillan, Manchester, Conn., assignor to Pioneer Parachute Company, Inc., Manchester, Conn., a corporation of Connecticut Application March 19, 1953, Serial No. 343,312

14 Claims. (Cl. 244—149)

This invention relates to parachutes and parachute packs and is directed particularly to pilot chutes used for drawing the main parachute or another parachute from a pack or housing in which it is enclosed.

Pilot chutes have been constructed heretofore in which there is a spiral or coiled spring which is compressed axially to a "pancake" form when enclosed with a parachute in a pack and thereafter expands axially to an extended form when the pack cover is released so as to eject the pilot chute from the pack to serve as an air anchor for drawing out the main parachute canopy.

The springs used in such pilot chutes are relatively strong or stiff and, therefore, it is difficult to compress them into collapsed position for packing. Moreover, they are only restrained within the pack by the pack cover and enclosed parachute canopy and, therefore, they tend to injure or become entangled with the folds of the parachute canopy making it necessary to locate an extra protecting flap or cover between the pilot chute and main parachute canopy. Even with this precaution the pilot chute may become displaced when the pack is moved about in use and as a result it sometimes expands sideways within the pack so as to injure the canopy or entangle with the shroud lines.

In accordance with the present invention these objections to constructions of the prior art are overcome and means are provided which serve to restrain the spring of the pilot chute prior to packing and within the pack until the moment when the ripcord is pulled to release the pilot chute and canopy. At such time the restraining means on the pilot chute is released for instant and normal operation of the spring to eject the pilot chute and perform its intended functions without danger of injury to the parachute canopy or entanglement with the lines.

One of the objects of the present invention is to provide an improved form of pilot chute with means for aiding in the packing and release thereof.

Another object of the invention is to prevent displacement and undesired expansion of the spring of a pilot chute canopy within a parachute pack.

A further object of the invention is to provide a pilot chute having a coiled or spiral ejecting spring with means for holding the spring in a compressed and restrained position during packing and while enclosed within a pack until the instant of release of the parachute.

These and other objects and features of the present invention will appear from the following description thereof in which reference is made to the figures of the accompanying drawing.

Figure 1:
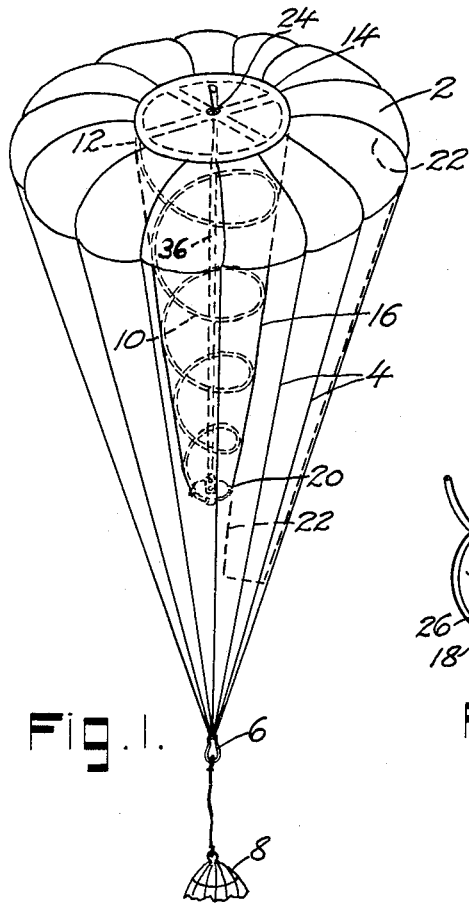
Fig. 1 is a perspective showing a typical form of pilot chute embodying the present invention.

In that form of the invention chosen for purposes of illustration in the drawing the pilot chute is shown as having a canopy 2 from which lines 4 extend downward to the attaching loop 6 for connecting the pilot chute to the main parachute canopy 8. The spring 10 is of a spiral type as shown in Fig. 2 and is arranged with the uppermost turn 12 thereof fixedly secured to a fabric or tape reinforcing portion 14 in the peak of the canopy to which the upper ends of the lines 4 may be secured. The main body of the spring 10 is housed within a "sock" or enclosure 16 and the lowermost turn 18 of the spring is secured to the lower portion of the enclosure as indicated at 20. If desired, the canopy also may be provided with vanes 22 formed of fabric and attached to the canopy and enclosure 16 so as to extend radially outward from the enclosure when the pilot chute is in its extended operative position as shown in Fig. 1.

In order to hold the spring 10 in a compressed and restrained position to facilitate packing and while the pack is closed, the reinforcing portion 14 in the peak of the canopy 2 is provided with a grommet 24. The lowermost turn 18 of the spring 10 has a plate 26 secured thereto by suitable means such as the tabs 28 and a locking cone 30 projects upward from the center of the plate in position to project through the grommet 24 when the spring is compressed axially to its stowed or pancake form for location within a parachute pack.

In the preferred form of the invention the locking cone 30 has two passages therethrough as shown at 32 and 34 and if desired the cone may have a swivel connection with the plate 26 so as to be rotatable with respect to the plate. When the spring 10 is compressed and the cone 30 projected through the grommet 24 in the peak of the canopy a temporary locking pin 38 is passed through the lower opening 34 in the cone so as to project over the reinforcing portion 14 in the peak of the canopy to prevent expansion of the spring. The spring 10 is thus held in a restrained position which permits easy handling of the pilot chute with the spring compressed for stowage in a parachute pack. The pilot chutes also may be conveniently stored for future use while in this compressed position since they then take up very little space and there is no danger of the springs of adjacent parachutes becoming entangled with each other.

Figure 2:
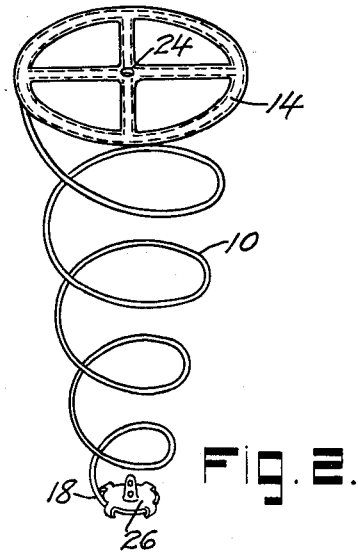
Fig. 2 is a perspective of the spring embodied in the parachute of Fig. 1.
Figure 3:
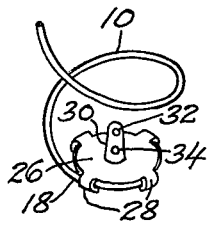
Fig. 3 is an enlarged view of a portion of the pilot chute spring illustrated in Fig. 2.
Figure 4:
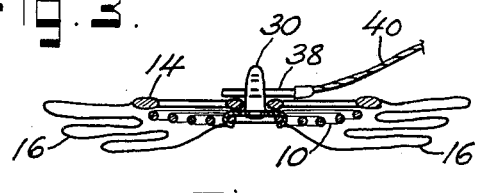
Fig. 4 is a diagrammatic sectional view of the pilot chute of Fig. 1 in compressed and restrained position for packing.

In compressing the spring of the pilot chute preparatory to insertion of the temporary locking pin 38, it has been found convenient to insert a tube 36 through the grommet 24 in the peak of the canopy until its lower end engages and fits over the cone 30 on the plate 26 of the expanded spring as shown in Fig. 1. Thereafter, on compressing the spring the tube is forced upward through the grommet 24 but at the same time prevents the cone 30 from being covered by folds of the fabric enclosure 16. The tube further serves to guide the cone 30 into the grommet 24 so that it will project therethrough into position to permit ready insertion of the temporary locking pin 38 through the lower opening 34 in the cone. The tube 36 is then removed for use in compressing and locking other pilot chutes and thus is used only as a convenient form of packing tool.

Figure 5:
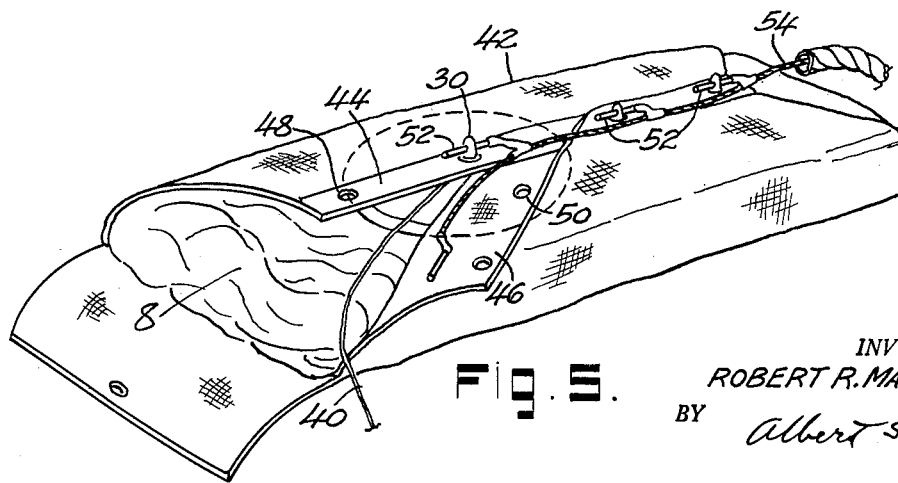
Fig. 5 illustrates a typical parachute pack in which the pilot chute of the present invention is enclosed.

When the pilot chute is to be placed in a parachute pack, such as that shown at 42 in Fig. 5, the pack flaps 44 and 46 preferably are both provided with grommets as shown at 48 and 50 for receiving the cone 30 projecting from the peak of the compressed pilot chute. The pilot chute then may be simply placed in position on top of the folded canopy 8 of the main parachute without any struggle or manipulation in compressing or restraining the spring of the pilot chute. The flaps 44 and 46 are then folded over the pilot chute with the cone 30 of the pilot chute projecting through the grommets 48 and 50 on the pack flaps. The usual rip cord pins 52 on the flap releasing rip cord 54 are then passed through the openings in the usual locking cones on the pack flaps and one of these pins is passed through the upper passage 32 in the pilot chute locking cone 30. Thereafter, the temporary locking pin 38 is withdrawn from the lower passage 34 in the pilot chute locking cone by pulling on the cord projecting from between the pack flaps 44 and 46.

When the pack is thus closed the rip cord locking pin 52 which engages pilot chute locking cone 30 holds the pilot chute restrained so that the pressure of the spring is not applied to either the folded main parachute or the pack covers. Furthermore, the pilot chute cannot be displaced within the pack since it is held in place by the locking cone 30, pack cover grommets 48 and 50 and rip cord locking pin 52. However, when the rip cord is pulled in the usual manner to release the pack flaps, it will at the same time disengage the pilot chute cone 30 and release the spring 10 for expansion to eject the pilot chute from the pack in exactly the same way as such springs have always operated heretofore. The main parachute canopy will then be drawn from the pack and there will be no danger of injury of the canopy by compression or tearing due to the unrestrained action of the pilot chute prior to release.

By arranging the pilot chute cone 30 so that it can swivel with respect to the plate 26 by which it is carried the insertion and removal of the rip cord locking pin 52 can be effected without any binding due to rotation of the pilot chute in inserting it into the pack. However, if desired the cone 30 may be made integral or otherwise fixed to the plate 26 or spring. The pilot chute can, of course, be used in combination with any type of parachute pack, such as a back pack, seat pack or chest pack, and it may be placed in other types of enclosures or housings for aiding in the release of cargo chutes or parachutes used with flares, bombs, deceleration and braking parachutes, or other equipment. When used with a back pack as shown in Fig. 5, the third locking pin on the rip cord may be used for locking the pilot chute in restraining position, whereas in seat packs or other types of parachute packs or enclosures, the second or other pin on the rip cord may be used.

While a particular type of pilot chute and spring means has been shown in the drawing and described above the present invention is capable of use with other constructions and in other combinations. In view thereof it should be understood that the particular embodiment of the invention shown and described is intended to be illustrative only and is not intended to limit the scope of the invention.

I claim:

1. A pilot chute having axially expandable spring means therein for ejecting the pilot chute from an enclosure and releasable means carried by said spring for holding said spring means in temporarily restrained position.

2. A pilot chute comprising a canopy, an axially expandable spring for ejecting the canopy from an enclosure, and releasable means carried by said spring and cooperating means on the canopy for holding the spring in temporarily restrained and axially compressed position.

3. A spiral chute comprising a canopy, a spiral spring extending axially from said canopy for ejecting the pilot chute from an enclosure, and releasable means carried by said spring and cooperating means on the canopy for holding the spring in temporarily restrained and axially compressed position.

4. A pilot chute comprising a canopy, a spiral spring extending axially from said canopy for ejecting the pilot chute from an enclosure, and releasable means on the canopy and spring including a locking cone carried by said spring, a grommet on said canopy and a pin releasably holding the cone and grommet in engagement.

5. A pilot chute comprising a canopy, a spiral spring extending axially from said canopy for ejecting the pilot chute from an enclosure, a grommet located adjacent the peak of said canopy, a locking cone carried by said spring and movable through said grommet on axial compression of the spring and a locking pin engageable with the cone and grommet and releasable therefrom to permit expansion of said spring.

6. The combination comprising a parachute enclosure having cover means for holding a main parachute in packed position within the enclosure, a pilot chute located within said enclosure between said main parachute and said cover means, a spring carried by the pilot chute for ejecting it from said enclosure on release of said cover means, releasable means on said spring means and cooperating means on said pilot chute and cover means restraining the action of said spring means with respect to said main parachute and said cover means until said releasable means is released.

7. The combination comprising a parachute enclosure having cover means for holding a main parachute in packed position within the enclosure, a pilot chute located within said enclosure between said main parachute and said cover means, a spring carried by the pilot chute for ejecting it from said enclosure on release of said cover means, releasable means on said spring means and cooperating means on said pilot chute, and cover means positively holding said pilot chute in fixed position within said enclosure and restraining the action of said spring means with respect to said main parachute and said cover means until said releasable means is released.

8. A parachute pack having cover means including flexible flaps with overlapping grommets thereon, a pilot chute located within said pack and having compressible spring means for ejecting the pilot chute from the pack, a locking cone on said spring means extending through said overlapping grommets, and a locking pin engaging said locking cone and overlying said grommets and holding said spring means in compressed position, said locking pin removable to release said pack flaps and permit said spring means to expand and eject the pilot chute from said pack.

9. A parachute pack having flexible flaps movable into overlapping relation to enclose a pilot chute and a main parachute within the pack, a pilot chute located within said pack adjacent said flaps and having a spiral spring arranged in axially compressed position for expansion to eject the pilot chute from the pack, interengaging means connected to said spring and pack flaps, and rip cord actuated means engaging said interengaging means and releasably holding said spring in said compressed position and holding said flaps in pack closing position.

10. A parachute pack having flexible flaps movable into overlapping relation to enclose a pilot chute and a main parachute within the pack, a pilot chute located within said pack adjacent said flaps and having a spiral spring arranged in axially compressed position for expansion to eject the pilot chute from the pack, said pilot chute having a canopy with a grommet in the peak thereof, said pack flaps having overlapping grommets thereon registering with the grommet in the peak of the parachute canopy, a locking cone carried by said spring and projecting through all of said grommets, and a locking pin removably passing through said locking cone and holding said spring in said compressed position and holding said pack flaps in pack closing position for simultaneous release on withdrawal thereof from said locking cone.

11. A pilot chute having a canopy with a reinforced portion in the pack of the canopy and provided with a grommet located centrally in said reinforced portion, a spiral spring arranged axially with respect to said canopy and having one end thereof bearing against said reinforced portion, the opposite end of said spring having a locking cone secured thereto and adapted to pass through said grommet when the spring is axially compressed, said locking cone having a passage therethrough for receiving a locking pin to hold the spring in an axially compressed position.

12. A pilot chute as defined in claim 11 wherein the locking cone has two passages therethrough for receiving locking pins in alternative positions.

13. A pilot chute as defined in claim 11 wherein the locking cone has a swiveled mounting on the spring for rotary movement about the axis of the spring.

14. A pilot chute as defined in claim 11 wherein means extend through said grommet to the locking cone for compressing the spring axially.

References Cited in the file of this patent

UNITED STATES PATENTS

| | | |
|---|---|---|
| 2,299,407 | Quilter | Oct. 20, 1942 |

FOREIGN PATENTS

| | | |
|---|---|---|
| 38,288 | France | Feb. 3, 1931 |
| | (addition to 657,672) | |